UNITED STATES PATENT OFFICE.

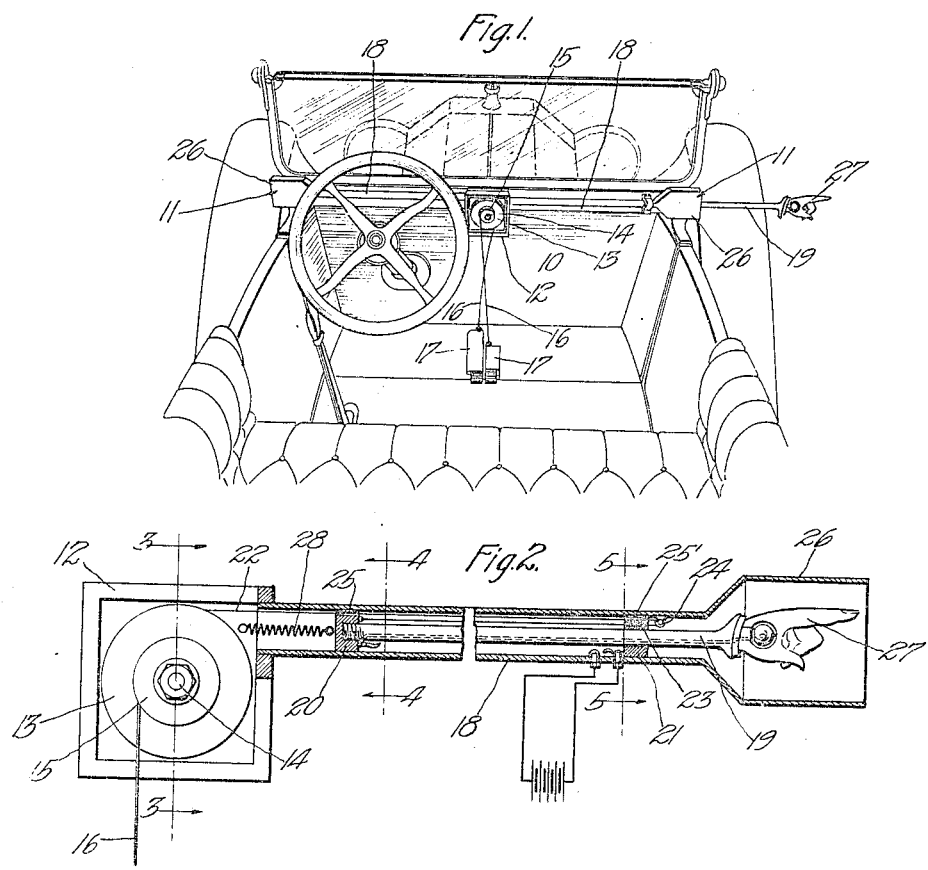

CHARLES M. NASH, OF COVINA, CALIFORNIA, ASSIGNOR OF ONE-HALF TO FRANK C. JOHNSON, OF COVINA, CALIFORNIA.

DIRECTION-INDICATOR FOR AUTOMOBILES.

1,225,721.

Specification of Letters Patent.

Patented May 8, 1917.

Application filed March 21, 1916. Serial No. 85,703.

*To all whom it may concern:*

Be it known that I, CHARLES M. NASH, a citizen of the United States, residing at Covina, in the county of Los Angeles and State of California, have invented new and useful Improvements in Direction-Indicators for Automobiles, of which the following is a specification.

My invention relates to a direction indicator for vehicles especially motor driven vehicles.

The ordinances of many municipalities require that the driver of a motor driven vehicle indicate before turning a corner, the direction he is about to take. Such ordinances are usually complied with by the driver or passenger extending his arm from the side of the vehicle, thereby indicating that he is about to turn in that direction.

It is an object of this invention to construct a mechanical direction indicator which is simple of construction, occupying little space, which may be easily installed in any motor driven vehicle and which is within instant reach of the driver for operating the same.

With the above and other objects in view which will appear as the description proceeds, my invention consists in the construction, arrangement and combination of parts hereinafter described and claimed.

My invention will be better understood with the aid of the accompanying drawings which form a part of this specification, and which illustrate a convenient and practical embodiment of my invention.

Figure 1 is a perspective view taken from the rear of the driver's seat showing the dash board of an automobile to which my direction indicator is applied.

Fig. 2 is a front elevation of my direction indicator partly in section.

Fig. 3 is a section on line 3—3, Fig. 2.

Figs. 4 and 5 are sections on lines 4—4 and 5—5, respectively of Fig. 2.

Referring to the drawings, 10 designates the dash board of an automobile. On the upper end thereof, a pair of direction indicator devices 11, 11 are mounted. The construction of these devices is exactly alike, and therefore it will be sufficient to describe only one of them. Referring to Fig. 2 of the drawings which shows the direction indicator on the right, the same comprises a square casing 12 in which a large grooved pulley 13 is rotatably mounted on a shaft or pin 14. On the same pin and fast to the large pulley 13, a smaller grooved pulley 15 is rotatably mounted. A flexible member such as a cord 16 is fast to the periphery of the small pulley 15 and is connected to a pivoted pedal 17 mounted on the foot board of the automobile. A horizontal guide tube 18 extends laterally from one side of the square casing 12 to the side of the car frame of the automobile. Slidably mounted in said guide tube 18 is an indicator carrying arm 19 provided with an end guide collar 20 secured to the inner end thereof. A stationary bushing 21 in which the outer end of said arm is slidably mounted is secured in the outer end of the guide tube 18. On the inner face of the collar 20, a flexible member 22 is secured which extends parallel to the arm 19 passing through a bore 23 of the bushing 21 and over a fixed pulley 24 mounted on the inner wall of the guide tube 18, thence back and through a bore 25 in the inner collar 20 to the periphery of the large pulley 13 to which it is attached. At the outer end of the tubular guide 18, a casing or housing 26 is mounted which is open at the outer end. A direction signal 27 suitably secured to the outer end of the arm 19 is normally inclosed within the casing 26. The signal arm 27 may have any desired or suitable shape, such as a hand. A helical spring 28 secured at one end to the outer face of the collar 20 and at the other to the pulley casing 12 tends to hold the signal arm and the signal carried thereby in inoperative position as shown.

I have shown the pulley casings of the two direction indicator devices as placed one on top of the other, (See Fig. 1.) If desired, they may be placed side by side.

From the foregoing description, the operation of my direction indicator will be easily understood. Let us assume that it is desired to use the device on the right; the right pedal 17 is depressed, which will, through its flexible connection 16 rotate the small and the large pulleys 15 and 13 in the direction indicated by the arrows in Fig. 2. Such rotation of the larger pulley will wind the flexible member 21 on the larger pulley, causing the signal arm 18 and the signal carried thereby to move outwardly in the positions indicated by the dotted lines in Fig. 2. This movement of the signal is opposed by the helical spring 28. Just as soon as the pressure on the pedal 17 is released, the helical spring will move the signal arm and signal to their normal inoperative position. Such movement of the signal arm and the flexible member 21 secured thereto will restore the pulleys and the pedal to their original position.

It is thus seen that I have devised a direction indicator which is extremely simple in construction and positive in operation. A slight pressure of the foot on the appropriate pedal will operate the direction indicator, and as soon as the pressure is released, the signal will be moved to its inoperative position within the housing 26.

Various changes in the details of the construction of my invention may suggest themselves to those skilled in the art without departing from the spirit of my invention as defined in the appended claim.

I claim:

In a direction indicator for vehicles, the combination of a pair of tubular casings, each casing having a housing at the outer end thereof, a signal arm slidably mounted in each casing, a signal carried by said arm and normally inclosed in said housing, a large grooved pulley, a small grooved pulley fast to said large pulley, a flexible member connected to said arms and wound about the periphery of the large pulley, a pair of independently operated pedals, a flexible member wound about said small pulley and connected to said pedals, a helical spring in each of said casings acting in opposition to said pedals for moving said arm and signal into inoperative position.

In testimony whereof I have signed my name to this specification.

CHARLES M. NASH.